United States Patent
Krasilchikov et al.

(10) Patent No.: US 6,477,900 B2
(45) Date of Patent: Nov. 12, 2002

(54) FLUIDIC GAS METERING SYSTEM

(75) Inventors: Yehezkel Krasilchikov, Katzrin (IL); Anna Litvak, Katzrin (IL)

(73) Assignee: Jet Sensor Ltd., Katzerin (IL)

( * ) Notice: Subject to any disclaimer, the term of this patent is extended or adjusted under 35 U.S.C. 154(b) by 0 days.

(21) Appl. No.: 09/755,168

(22) Filed: Jan. 8, 2001

(65) Prior Publication Data

US 2002/0124659 A1 Sep. 12, 2002

(51) Int. Cl.$^7$ ................................................ G01F 1/20
(52) U.S. Cl. .................................................. 73/861.19
(58) Field of Search ........................ 73/861.19, 861.21, 73/861.23, 861.29, 195, 196, 197, 24, 22.2; 439/76; 455/126; 137/804, 9, 826, 842, 833; 834/835; 141/59; 379/114

(56) References Cited

U.S. PATENT DOCUMENTS

| | | | | |
|---|---|---|---|---|
| 4,255,964 A | * | 3/1981 | Morison ........................ 73/24 |
| 4,550,614 A | * | 11/1985 | Hezrl ....................... 73/861.19 |
| 4,610,162 A | | 9/1986 | Okabayashi et al. |
| 4,930,357 A | * | 6/1990 | Thurston et al. .......... 73/861.19 |
| 5,179,970 A | * | 1/1993 | Jarocki et al. .................. 137/9 |
| 5,239,695 A | | 8/1993 | Jung |
| 5,309,770 A | * | 5/1994 | Okabayashi .............. 73/861.19 |
| 5,335,553 A | | 8/1994 | Ueki et al. |
| 5,353,704 A | | 10/1994 | Canto |
| 5,363,704 A | * | 11/1994 | Huang ...................... 73/861.19 |
| 5,610,162 A | | 3/1997 | Witzel et al. |
| 5,721,768 A | * | 2/1998 | Stimson et al. ............. 379/114 |
| 5,780,747 A | * | 7/1998 | Soo .......................... 73/891.29 |
| 5,869,758 A | * | 2/1999 | Huiberts ....................... 73/197 |
| 6,223,789 B1 | * | 5/2001 | Koch .......................... 141/59 |
| 6,250,132 B1 | * | 6/2001 | Drzewiecki ................. 73/23.2 |

FOREIGN PATENT DOCUMENTS

| | | |
|---|---|---|
| EP | 0 306 193 | 3/1989 |
| EP | 0 393 938 | 10/1990 |

* cited by examiner

Primary Examiner—Benjamin R. Fuller
Assistant Examiner—Jewel V Thompson
(74) Attorney, Agent, or Firm—Oliff & Berridge, PLC

(57) ABSTRACT

A fluidic gas metering system interposed in a line running from a gas source to a user site to meter the gas stream being supplied to the user in a broad flowrate range defined by a low flowrate band at the lower end of the range, a medium band at the middle of the range and a high band at the upper end thereof. The system includes an input chamber which receives a stream of pressurized gas from the source and an output chamber from which the gas is supplied to the user. Intercoupling the chambers are three gas flow channels. The first channel is defined by a first fluidic generator operative only when the flowrate of the gas lies in the low band to yield periodic pulses whose frequency is proportional thereto. The second channel is defined by a second fluidic generator operative only when the flowrate of the gas lies in the medium band to yield periodic pulses whose frequency is proportional thereto. The third channel is defined by a bypass passage operative only when the stream lies in the high band, the bypass acting to divide the gas stream between the second and third channel whereby the second generator then meters flowrate in the medium band. The periodic pulses yielded by the first and second generators are processed and totalized to provide accurate readings of the gas consumed by the user throughout the full range.

18 Claims, 2 Drawing Sheets

FLUIDIC GAS METERING SYSTEM

BACKGROUND OF THE INVENTION

1. Field of the Invention

This invention relates generally to fluidic gas metering systems for metering the flowrate of a gas stream being supplied to a user, and in particular to a system of this type which is accurate throughout a broad range, yet exhibits a low pressure drop throughout this range.

2. Background of the Invention (Status of Prior Art)

The supply of natural gas to a residential, commercial or industrial user must be accurately metered in order to be able to calculate the exact charge to be imposed on the user for the amount of gas he has consumed. The range of the metering system must be sufficient to accommodate the gas requirements of the user, and the system must not produce an excessive pressure drop in the gas line. The reason a low pressure drop is an important desideratum is that the metering system is interposed in a gas line extending from a gas supply source to the site of the user and therefore acts as an impedance in the line that resists gas flow.

A preferred type of gas metering system makes use of a fluidic flowmeter having a broad range such as the "Fluidic Flowmeter with Large Flow Metering Range" disclosed in the U.S. patent to Kang et al. U.S. Pat. No. 5,239,695 (1994). The main component of a fluidic flowmeter is a fluidic oscillator which generates periodic fluid pulses at a repetition rate proportional to the flowrate of the fluid being metered.

Also disclosing fluidic gas flowmeters are the following U.S. patents:

A. U.S. Pat. No. 5,309,770 (1994) to Okabyashi
B. U.S. Pat. No. 5,335,553 (1994) to Ueki et al.
C. U.S. Pat. No. 5,353,704 (1994) to Huang Among the many advantages of a fluidic gas flowmeter are the following:

1) The meter is linear throughout its operating range. Hence the repetition rate or frequency of output pulses of the meter is proportional to the flowrate of the gas being metered.
2) The meter has no moving parts and is therefore unaffected by shock and vibrating forces.
3) The meter has a high degree of rangeability.
4) The meter can be calibrated in terms of volumetric flow unaffected by changes in density.
5) The meter does not require repair or maintenance.

The geometry of a standard fluidic flowmeter is such that when a stream of gas is injected into the space between two inclined side walls to initiate the operation of the meter, then because of a Coanada effect, the stream attaches itself to one of these walls, a portion of the flow being diverted through a feedback passage to a control port. This feedback flow enlarges a separation bubble which peels the stream away from the wall to which it is attached, until it locks onto the opposite wall where a similar feedback action takes place. Hence the stream oscillates between the walls and does so at a frequency proportional to its flowrate.

Associated with this fluidic oscillator is a transducer which converts the fluidic pulses to periodic electrical pulses whose repetition rate is proportional to the instantaneous flowrate of the gas. By totalizing these pulses one obtains an accurate indication of the total flow usually expressed in terms of liters of gas consumed by the user.

The quantity of gas metered by the system, when expressed in liters per hour, is equal to the number of pulses yielded by the fluidic oscillator in the specified period multiplied by the amount of gas contained in a single pulse.

It is not only essential that a gas metering system be linear throughout a broad flowrate range, but it is also vital that the pressure drop produced by the system in the line supplying the gas to a user site be low throughout the entire range. Thus should a system exhibit a low pressure drop except in the upper region of the range, it wold not be acceptable to a gas supply company which must accurately meter the gas it supplies to its customer and cannot tolerate a high pressure drop.

The basic requirement that a metering system be accurate throughout a broad flowrate range is not difficult to satisfy with meters using fluidic oscillators. But the requirement that the same system exhibit a low pressure drop throughout its entire range is troublesome. Existing fluidic meters have a more or less low pressure drop when operating in a broad flowrate range except in the upper region of the range where the pressure drop exceeds an acceptable level.

Inasmuch as a fluidic metering system in accordance with the invention includes a bypass passage, of prior art interest in U.S. Pat. No. 5,610,162 (1986) to Okabayashi et al. The fluidic metering system disclosed in this patent includes upstream and downstream fluidic elements, one having a jet nozzle whose opening area is smaller than that of the jet nozzle in the other element. A bypass passage having a valve therein is disposed in parallel with the element which has a small area nozzle. This patent points out that the smaller the area of the jet nozzle opening, the greater is the sensitivity of the meter but the larger is its pressure drop.

SUMMARY OF THE INVENTION

In view of the foregoing, the main object of this invention is to provide a fluidic gas metering system which accurately measures the flowrate of a gas stream being supplied to the site of a user throughout a broad range, the system producing a pressure drop which is low throughout its entire range.

More particularly, an object of the invention is to provide a system of the above type in which the flowrate range is divided into low, medium and high flowrate bands, each band being handled by a separate channel, with only two of these channels having a fluidic generator therein. The channel arrangement such that one of the two generators measures flowrate in both the medium and flowrate bands.

Also an object of this invention is to provide a metering system of the above type, which can be manufactured at relatively low cost to produce a compact, self-sufficient unit that is efficient and reliable in operation.

Yet another object of this invention is to provide a gas metering system which is compensated for variations in ambient temperature, barometric pressure or other variables which in the absence of compensation render the meter readings somewhat inaccurate.

Still another object of this invention is to provide a fluidic metering system whose operation is controlled by a microprocessor which acts to process the pulse data supplied thereto by two fluidic generators to provide a reading of the gas consumed by the user that is accurate throughout a broad range.

A significant feature of a system in accordance with the invention which includes a microprocessor is that the digital data acquired by the microprocessor can be microwave transmitted to a customer billing station, to an Internet web site or to any external station in need of this data.

Briefly stated these objects are attainable in a fluidic gas metering system interposed in a line running from a gas source to a user site to meter the gas stream being supplied to the user in a broad flowrate range defined by a low flowrate band at the lower end of the range, a medium band at the middle of the range and a high band at the upper end thereof. The system includes an input chamber which receives a stream of pressurized gas from the source and an output chamber from which the gas is supplied to the user.

Intercoupling the chambers are three gas flow channels. The first channel is defined by a fluidic generator operative only when the flowrate of the gas lies in the low band to yield periodic pulses whose frequency is proportional thereto. The second channel is defined by a fluidic generator operative only when the flowrate of the gas lies in the medium band to yield periodic pulses whose frequency is proportional thereto. The third channel is defined by a bypass passage operative only when the stream lies in the high band, the bypass acting to divide the gas stream between the second and third channel whereby the second generator then meters flowrate in the medium band. The periodic pulses yielded by the first and second generators are processed to provide accurate readings, of the gas consumed by the user throughout the full range.

BRIEF DESCRIPTION OF THE DRAWINGS

For a better understanding of the invention as well as further features and objects thereof, reference is made to the annexed drawings wherein.

DETAILED DESCRIPTION OF THE INVENTION

The Metering System

Figure 1:
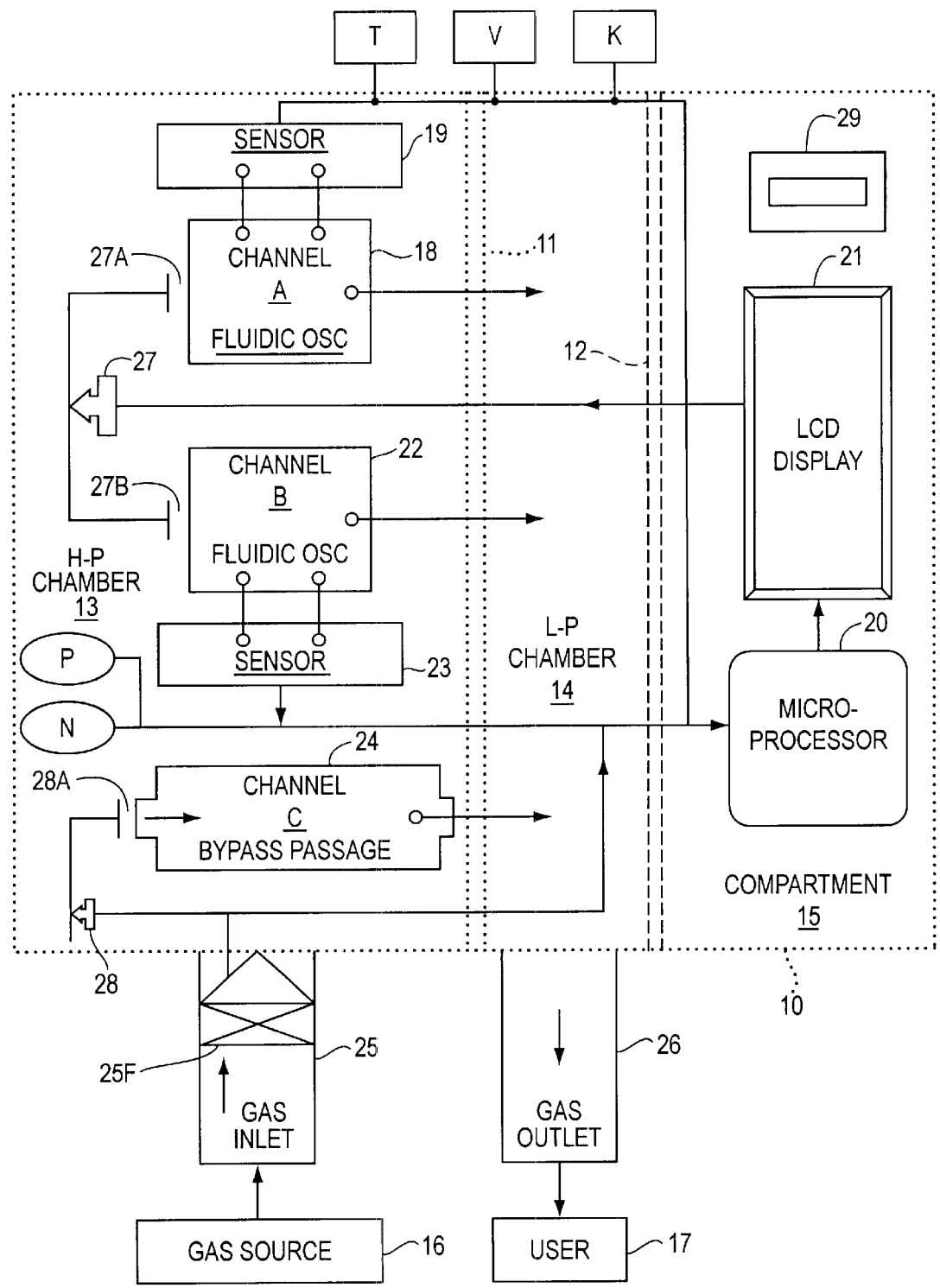
FIG. 1 is a block diagram of a fluidic gas flowrate metering system in accordance with a preferred embodiment of the invention.

As shown in FIG. 1, a system in accordance with the invention for accurately metering the flowrate of a gas stream through a broad range, includes three flow channels A, B and C. Channel A is reserved for flowrates in a low flowrate band at the lower end of the full range to be metered. Channel B is reversed for flowrates in a medium flowrate band in the mid-section of the range. And Channel C is reserved for flowrates in a high flowrate band at the upper end of the range. These bands will hereafter be referred to as low, medium and high bands.

By way of example, we shall assume that the broad range of flowrates to be metered runs from 1 liter per hour to 90 liters per hour. This range consists of a low band (1 to 30 liters per hour) at the bottom end of the range, a medium band (28 to 60 liters per hour) in the middle of the range, and a high band (58 to 90 liters per hours) at the upper end of the range. The reason for overlap at the unctions of the bands is to provide hysteresis to retard the transition from one band to another.

In the context of the gas metering system which includes separate valves for effecting a transition from one band to another, the purpose of hysteresis is to prevent an excessively rapid closing and opening of the valves, the resultant valve fluctuations impairing the operation of the system.

The entire system which is battery-powered and self-sufficient, is enclosed in a casing 10 that is compartmentalized by partition walls 11 and 12 into a high-pressure chamber 13, a low-pressure chamber 14, and a data processing compartment 15.

The gas to be metered flows through a gas line running from a supply source 16 to a user site 17, the quantity of gas consumed by the user being metered by the system which is interposed in the line. Hence it is essential not only that the system accurately meter the gas being supplied to the user site, but also that the pressure drop introduced by the system in the line be low in the low, medium and high bands of the full metering range.

Channels A, B and C intercouple the high-pressure and low-pressure chambers 13 and 14, so that when any of these channels is open and operative, a stream of gas then flows through the operative channel from the high-pressure to the low-pressure chamber.

Channel A is defined by a fluidic oscillator 18 which when a gas stream whose flowrate is in the low band is being supplied to the user, then produces periodic fluid pulses whose repetition rate is proportional to the flowrate. These fluid pulses are applied to a pressure-responsive transducer, such as a piezoelectric transducer 19 which converts the fluid pulses to corresponding electrical pulses. Transducer 19 in combination with oscillator 18 form a fluidic generator. The pulsating signal yielded by this generator is applied to a microprocessor 20 disposed in data processing compartment 15 which acts to process and totalize the quantity of gas being consumed by the user in terms of liters. The frequency of the pulses yielded by the generator represents the instantaneous flowrate of the gas and these pulses must be totalized in the processor to obtain a liters reading.

This reading is indicated by an LCD device 21 coupled to microprocessor 20 or similar display means capable of displaying data in alpha-numeric terms. Channel B is defined by a fluidic oscillator 22 which is operative when the flowrate of the gas stream lies in the medium band to produce periodic fluid pulses whose repetition rate is proportional to the flowrate of the gas. These fluid pulses are applied to a piezoelectric transducer 23 which converts these pulses into a pulsating signal that is fed into microprocessor 20 for processing. This second oscillator in combination with the transducer 23 constitutes a second fluidic generator.

Channel C is defined by a bypass passage 24 which when the flowrate being supplied to the user lies in the high band, then conducts a minor component of the gas stream from high pressure chamber 13 to low pressure chamber 14, the major component then flowing through channel B where it is metered by the second fluidic generator.

Fed into high-pressure chamber 13 through an inlet port 25 coupled to gas source 16 is natural gas at a nominal gas pressure, normally 300 mm $H_2O$. To prevent particulate matter carried by the gas from entering the metering system, a filter 25 is placed in port 28. The gas flowing through channels A, B and C into low pressure chamber 14 is discharged into a gas outlet 26 from which it is supplied to user site 17. Hence the metering system is interposed in the line running from source 16 to user site 17 and acts to meter the amount of gas supplied to this site.

The flow of gas into channels A and B is controlled by a bi-stable solenoid dual valve 27 installed in high-pressure chamber 13. Valve 27 which is electromagnetically actuated by a DC voltage applied thereto by microprocessor 20, is provided with a sealable port 27A a the inlet to channel A and a sealable port 27B at the inlet to channel B. The DC voltage applied to valve 27, when in one polarity, causes port 27A to open and port 27B to close, but when in the reverse polarity, opens port 27B and closes port 27A. Hence the bi-stable valve renders either channel A or channel B operative, but never both channels at the same time.

Since the periodic pulses yielded by the generator in channel A when this channel is operative have a frequency proportional to the flowrate of gas in the low band, then these pulses are totalized by microprocessor 20 to produce a liters reading which is displayed by LCD device 21. The periodic pulses yielded by the fluidic generator in channel B have a frequency proportional to gas flowrate in the medium band, and when channel B is operative, LCD 21 then indicates the quantity of gas consumed by the user in the medium band of the range.

Also installed in high-pressure chamber 13 is a single action solenoid valve 28 having a sealable port 28A at the inlet by bypass channel C. Hence only when this port is caused to open by a DC voltage applied to valve 28 by microprocessor 20, can gas from high-pressure chamber 13 then enter channel C and flow therethrough to low-pressure chamber 14. The DC control of valves 27 and 28 is such that when the port 28A of valve 28 is open, then port 27B of valve 27 is also open.

Operation of System

Initially, port 27A is open to admit gas into channel A and port 21B is closed to prevent gas from entering channel B. And valve port 28A in channel C is then closed so that no gas can be bypassed.

When the flowrate of the gas being supplied to the user lies in the low band in the range, all gas in input chamber 13 then flows into channel A whose fluidic generator yields pulses having a repetition rate proportional to the flowrate. These pulses are conveyed to microprocessor 20 whose liters reading is displayed on LCD device 21.

However, when microprocessor 20 which is responsive to the pulses of the fluidic generator in channel A senses a flowrate that is above the low band, the pulsatory signal it then feeds to microprocessor 20 causes the microprocessor to apply a DC voltage to solenoid valve 21 which then closes port 27A and opens port 21B. Hence which channels A and C are closed, now flowing through channel B is a gas stream whose flowrate lies in the medium band of the range. This flowrate is metered by the fluidic generator in channel B and processed by the microprocessor so that now displayed on the screen of LCD 21 is the liters reading in the medium band of the range.

When microprocessor 20 responding to the pulses from channel B senses that the flowrate of the gas stream has risen above the medium band, it then applies a DC voltage to actuate valve 28 to open port 28A in the inlet of bypass Channel C. This state only comes about when the flowrate lies in the high band of the range, in which state channel B and C are both open and channel A is closed. The orifice of the bypass channel is dimensioned so as to divide the gas stream hen being metered so that a minor component flow through channel C while a major component through channel B.

The major components which flows through channel B lies in the medium band of the range. Hence even though the gas stream being then supplied to the user lies in the high band, the fluidic generator which is then metering this stream is doing so in the medium band.

The operation of microprocessor 20 is such as to produce a valve-actuating voltage when the pulsatory signal applied thereto indicates that the flowrate frequency is at the border of adjacent bands.

In order for the system to provide a proper reading when the flowrate lies in the high band, microprocessor 20 which is advised by transducer 23 in channel B when the flowrate rises above the medium band, then acts to modify the mathematical weight of the pulses yielded by the fluidic generator in channel B so hat the pulses are indicative of the flowrate in the high band. Thus when only channel A is operative (Mode I), LCD 21 displays the liters of gas consumed by the user in the low band. When only channel B is operative (Mode II) then displayed is the liters of gas consumed in the medium band of the range. And when channel A is inoperative and both channels B and C are operative (Mode III) then displayed on the LCD is the liters of gas consumed in the high band of the range.

In order to totalize the pulses yielded by the fluidic generators included in the system, the volume of gas contained in each pulse must be multiplied by the frequency or repetition rate of these pulses. This frequency is indicative of the instantaneous flow rate of the gas being metered. Microprocessor 20 which carries out the calculation must give in terms of the value of one pulse in liters that are appropriate to which one of the following conditions is in effect in the course of metering the gas.

Condition (1) This condition is in effect when fluidic pulses are being yielded by the fluidic generator (G1) in the Channel A low-frequency band of the system.

Condition (2) This condition is in effect when fluidic pulses are being yielded by the fluidic generator (G2) in the Channel B medium-frequency band, the Channel C bypass passage then being closed so that all of the gas flows through Channel B.

Condition (3) This condition is effectively the same as Condition (2) except that the bypass passage in Channel C is open so that only a portion of the gas flows through Channel B.

In the Table below, an example is given of data regarding the value of One Pulse in Liters processed in microprocessor 20 to calculate the liters of gas being consumed by the user and being metered by the system.

| Value of One Pulse in Liters | Frequency |
| --- | --- |
| G1 = 4.3287 * $10^{-5}$ | F1 ≈ 45 → 330 Hz |
| G2 = 1.6521 * $10^{-3}$ | F2 ≈ 6 → 130 Hz |
| G2 plus open bypsss ≈ 1.853 * $10^{-4}$ | F3 ≈ 6 →130 Hz |

It is to be noted that in Mode I, the pressure drop of the system is that produced only by channel A, while in Mode II, the pressure drop is only that produced by channel B, the drop being low in both instances. And while in a high flowrate band, a fluidic flowmeter usually has a higher pressure drop, in Mode III, the pressure drop is determined by channel B in conjunction with bypass channel C and is therefore low. Thus the system has a low pressure drop throughout its entire range.

Structural Features

Fluidic oscillator 18 in channel A has only to meter flowrate is the low band of full range. It therefore may consist of two bi-stable fluidic elements formed of separate molded plastic boards mounted one above the other. In this stacked arrangement, the output channels of one element are coupled to respective control inputs of the other element via an intermediate communication board.

Figure 2:
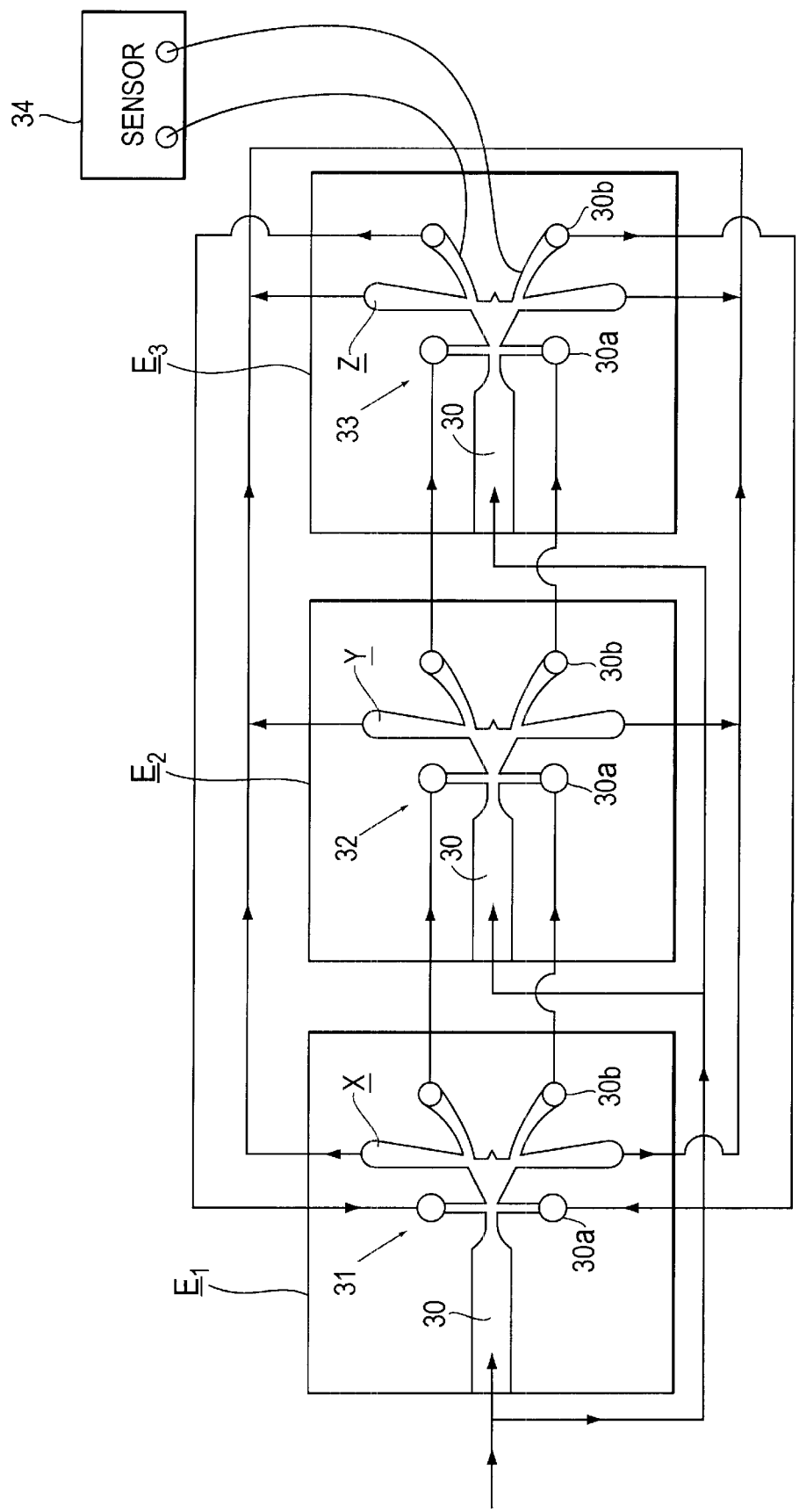
FIG. 2 is a schematic diagram of a three element fluidic oscillator included in the system.

Fluidic oscillator 22 in channel B is required to meter the gas stream in the medium band and preferably consists of three bi-stable elements formed on separate boards, one above the other so that the respective output channels of one element are connected to control inputs of another element. One such three-element arrangement is shown in FIG. 2, to be later described.

Bypass passage 24 in channel C is created by plates arranged in layers, with a central feeding channel. Valves 27 and 28 are each formed by a strike element created by a disc layer having an annular groove whose inner diameter corresponds to that of the valve seat.

Microprocessor 20 is provided with software which functions to calculate the quantity of gas flowing though the fluidic meter in accordance with the equation:

$Q = f \times q$, wherein:

$Q$ is the amount of gas in liters per hour flowing through the meter, $f$ is the number of fluid pulses yielded by the fluidic oscillator, and $q$ is the amount of gas in a single pulse.

Compensation

To enhance the accuracy of the metering system, means may be provided to compensate for variations in the ambient temperature to which the gas meter is subjected, or to compensate for any other variable which affects the accuracy of the reading.

Thus associated with the system is a temperature sensor T which is installed adjacent the gas line going to the meter so as to sense the prevailing temperature, the sensor signal is applied to microprocessor 20 which acts to correct the calculated flowrate to compensate for the effect of temperature thereon. If sensor T yields an analog signal then it is applied through an analog-to-digital converter to the microprocessor so that it can be digitally processed.

In some instances, the gas meter may be installed at a site above or below sea level and this may adversely affect calculations of the energy value of the gas being metered. To obviate the effects of barometric variations on the meter, a barometric sensor V is provided whose output is fed into microprocessor 20 which then compensates the reading for variations in barometric pressure.

Also affecting the metering accuracy of the system are changes in the caloric content of the gas being metered. Since natural gas comes from various sources having different caloric contents, a caloric sensor K is provided whose output is fed to the microprocessor to adjust the readings.

Also one may include in the system a gas pressure sensor P or any other sensor N to sense and compensate for other variables. It must be borne in mind that the meter is acceptably accurate in the absence of these external sensors, and that the purpose of the sensors is to realize a higher order of accuracy.

The fluidic gas metering system disclosed herein, in order to measure gas flowrate throughout a broad range, divides this range into three bands: low, medium and high, each being assigned a separate channel. In the low band channel a fluidic generator therein acts to meter gas flowrate in this band, and in the medium band channel a second fluidic generator acts to meter gas flowrate in that band. The high band channel which is formed by a bypass passage diverts a portion of the gas stream so that the fluidic generator in the second channel then acts to meter the flowrate in the high band.

In practice, the system may be arranged to divide the range into more than three bands, such as a four channel system having a low flowrate band, a low medium band, a high medium band and a high band. In this arrangement there will be included in each of the low, low medium and high medium channels a separate fluidic generator, the fourth channel being reserved for a bypass passage.

Reader

The metering system may be associated with a reader 29 for scanning a pre-paid card similar to a card used to operate a public laundry machine or a public telephone for a predetermined time period. In this instance, the card will entitle its purchaser to a predetermined amount of gas energy which depends on the amount paid for the card.

Thus if the card costs 25 dollars and entitles is user to 1000 liters of gas, then each time the card holder inserts the card, he can then key in the amount of gas he wishes to purchase, say 100 liters, the card then being downgraded by this amount. When the user has exhausted his gas entitlement, the card is no longer valid.

Associated with the card reader 29 is visible or audible alarm (not shown) which alerts the card holder when he inserts his card that it is nearly used up and that it would be best for him to purchase a fresh card. The prepaid card reader operates in conjunction with a mater valve which shuts off the gas supply when the pre-paid card is exhausted, and reopens the supply when a fresh card is inserted.

The advantage of a pre-paid card is that is obviates the need for a gas supply company to bill its customers, and to notify a customer when he is in arrears for payment, an to shut off the supply of gas when no payment has been received. With the prepaid card, the customer is never behind in his payments and the gas supplied to him has already been paid for.

The system may also be linked by a modern to an Internet highway so that digital data stored in the microprocessor can be transmitted to a web site functioning as a gas billing station, or to any other web site that requires the data. To identify the metering system sending out the data, the data is preceded by an identifying symbol or code in digital form.

Three-Element Fluidic generator

The reason for using a three-element fluidic generator in channel B is that it has a faster response time than a two-element generator and therefore is more suitable for metering the flowrate of a gas stream when the flowrate lies in the medium band of the range.

As shown in FIG. 2, the three element generator for channel B is formed by elements E1, E2 and E3, each having a primary gas input 30. The inputs to the three elements are connected in parallel so that they concurrently receive the gas to be metered. Each primary input flows into a pair of secondary inlets 30A and a pair of secondary outlets 30B. The secondary inlets 30B of each element are couple to the secondary outlets of another element.

Each element is also provided with a pair of primary outlets X, Y and Z. These are connected in parallel to supply the gas being metered to the site of the user.

The periodic pulses generated by the fluidic oscillator are sensed by piezoelectric transducer 34 which yields a pulsatory signal the repetition rate of which is proportional to the flowrate of the gas being metered.

It is to be understood that the fluidic oscillators included in the system need not be those disclosed herein but may be constituted by whatever fluidic oscillators are capable of metering the flowrate of a gas in the flowrate band being metered.

While there has been shown preferred embodiments of the invention it is to be understood that many changes and modifications may be made therein without departing from the spirit of the invention. Thus the valves included in the system need not be of the solenoid type and may in practice be of the motor-driven ball or of any other type responsive to a control voltage applied thereto by the microprocessor. And it is not necessary to provide a separate piezoelectric sensor for each fluidic generator, for the two generators may share a common sensor.

What is claimed is:

1. A fluidic gas metering system producing a low pressure drop when interposed in a line running from a gas source to a user site, the gas being supplied to the site via the system in a broad flowrate range defined by a low flowrate band in the lower portion of the range, a medium band in the middle portion and a high flowrate band in the upper portion thereof, said system comprising:

an input chamber into which is fed a stream of pressurized gas derived from said source;

an output chamber from which the gas stream is supplied to said user site;

a first channel intercoupling the input chamber to the output chamber defined by a first fluidic generator through which the gas stream is flowable operative only when the gas stream has a flowrate in the low band to yield periodic electrical pulses having a repetition rate proportional thereto;

a second channel intercoupling the input chamber to the output chamber defined by a second fluidic generator operative only when the gas stream has a flowrate in the medium band to yield periodic electrical pulses having a repetition rate proportional thereto;

a third channel intercoupling the chambers defined by a bypass passage operative only when the flowrate of the gas stream lies in the high band, the third channel then acting to divide the gas stream into a minor component which is bypassed thereby, and a major component which flows through the second fluidic generator in the second channel and has a flowrate lying in the medium band;

metering means including a processor coupled to the first and second generators to process the electrical pulses yielded thereby during operation of the system to meter the flow of gas in the low, medium and high bands and to totalize the pulses to provide accurate readings of the gas consumed by the user throughout the entire range; and means to indicate said readings.

2. A system as in claim 1, in which said first and second generators each include a fluidic oscillator and a transducer responsive to fluidic pulses yielded by the oscillator to produce corresponding electrical pulses.

3. A system as in claim 2, in which the transducer is a piezoelectric element.

4. A system as in claim 2, in which the first generator is composed of two fluidic elements.

5. A system as in claim 2, in which the second generator has three fluidic elements.

6. A system as in claim 1, in which the processing means is a microprocessor which calculates the quantity of gas consumed in terms of liters by multiplying the frequency of the pulses by the volume of gas contained in a single pulse.

7. A system as in claim 1, further including a dual valve which operates under the control of said processor when the flowrate lies in the low band to open the first channel and to close the second channel, which operates when the flowrate lies in the medium band to close the first channel and to open the second channel.

8. A system as in claim 7, further including a single valve operative only when the flowrate of the stream lie in the high band to open the third channel to a minor component of this stream, whereby a major component which lies in the medium band then flows through the second channel.

9. A system as in claim 8, further including means to actuate the dual and the single valves with actuating voltage in a sequence in which when the flowrate of the gas stream being metered lies in the low band, the stream is caused by the dual valve to then flow through the first channel, when the flowrate lies in the medium band, the dual valve causes the stream to then flow through the second channel, and when the flowrate lies in the high band, the single valve causes a minor component of the stream to flow in the third channel.

10. A system as in claim 1, further including an LCD device to display the flowrate readings.

11. A system as in claim 6, further including means to transmit flowrate data contained in said microprocessor to a remote station.

12. A system as in claim 1, further including means provided with a temperature responsive sensor to compensate the meter readings for changes in ambient temperature.

13. A system as in claim 1, further including means provided with a barometric sensor to compensate the meter readings for changes in barometric pressure.

14. A system as in claim 1, further including means provided with a gas pressure sensor to compensate the meter readings for changes in the pressure of gas being metered.

15. A system as in claim 1, further including means provided with a calometric sensor to compensate the meter readings for changes in the calometric value of the gas being metered.

16. A system as in claim 1, has associated with the system is a pre-paid card reader adapted to supply the user who inserts the card in the reader with a predetermined amount of gas.

17. A system as in claim 6, further including means coupled to the microprocessor for conveying digital data stored therein regarding flowrate to a remote station.

18. A system as set forth in claim 1, further including valve means controlled by the processor to cause the first channel to close and the second channel to open only when the rate of pulses being received by the processor exceeds the highest rate of pulses in the low band, and to cause the third channel to open only when the rate of pulses being received by the processor exceeds the highest rate of pulses in the medium band.

* * * * *